April 14, 1953 — I. KAPLAN — 2,634,877
TACKING FOR PRESSURE SENSITIVE ADHESIVE
TAPE AND ADHESIVE ROLL FOR THE SAME
Filed Jan. 25, 1949 — 4 Sheets-Sheet 1
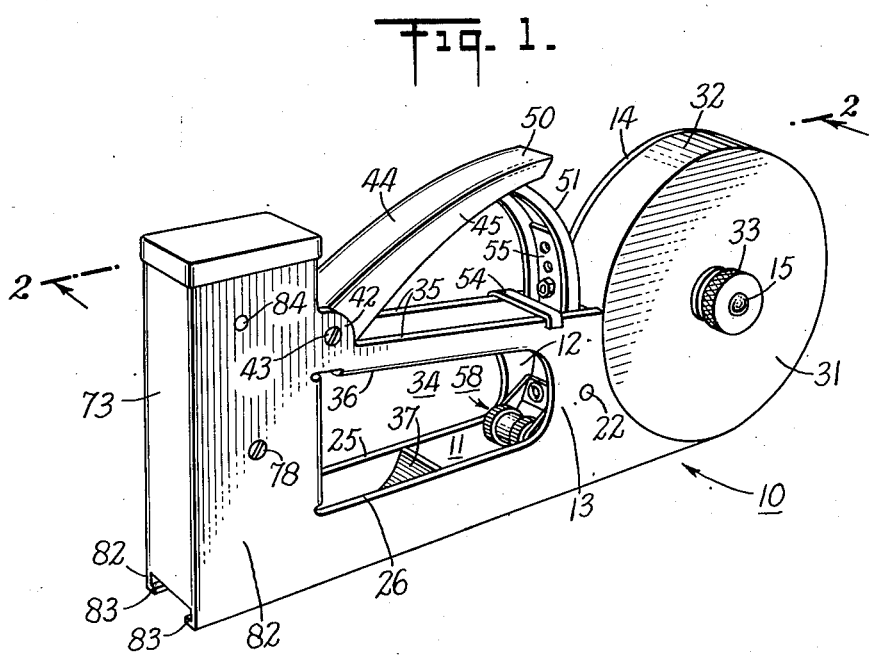
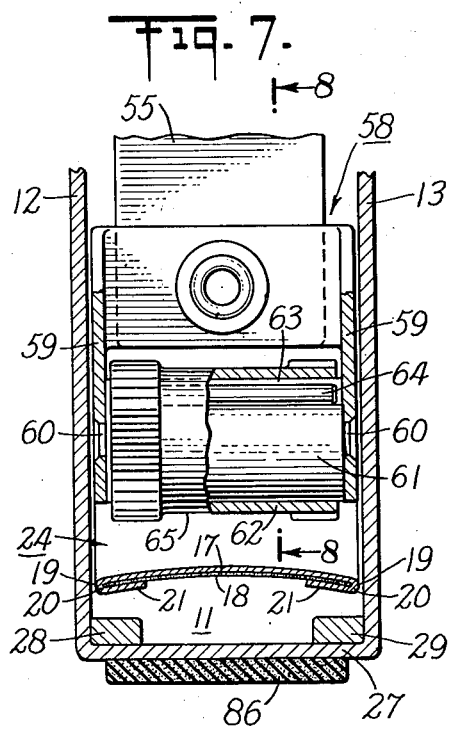
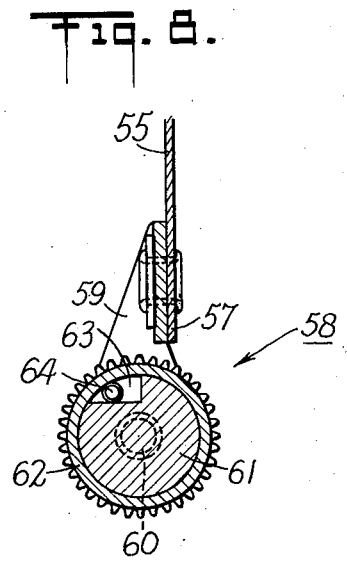
INVENTOR
Irving Kaplan
BY
his ATTORNEY

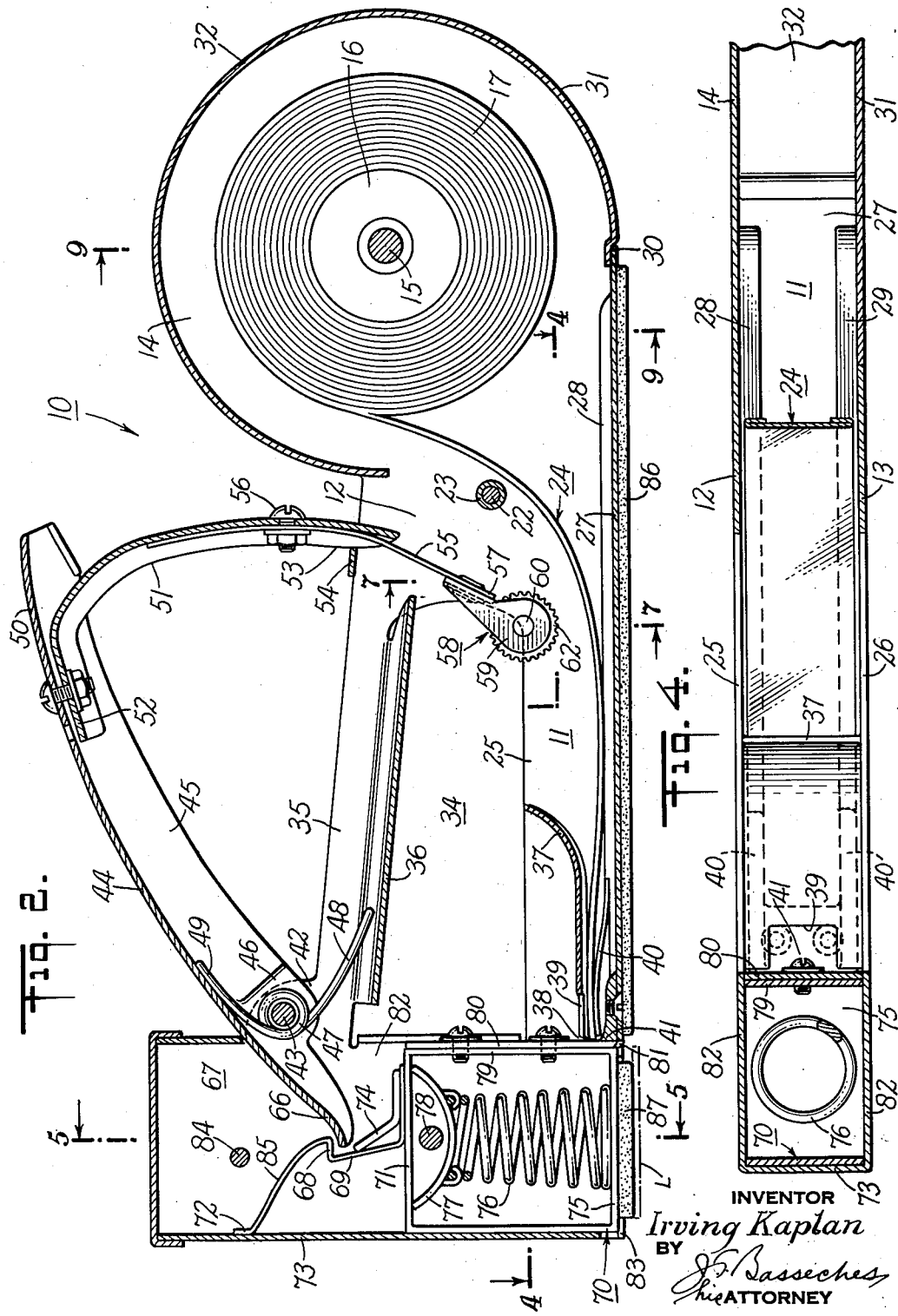

April 14, 1953          I. KAPLAN          2,634,877
TACKING FOR PRESSURE SENSITIVE ADHESIVE
TAPE AND ADHESIVE ROLL FOR THE SAME
Filed Jan. 25, 1949          4 Sheets-Sheet 3
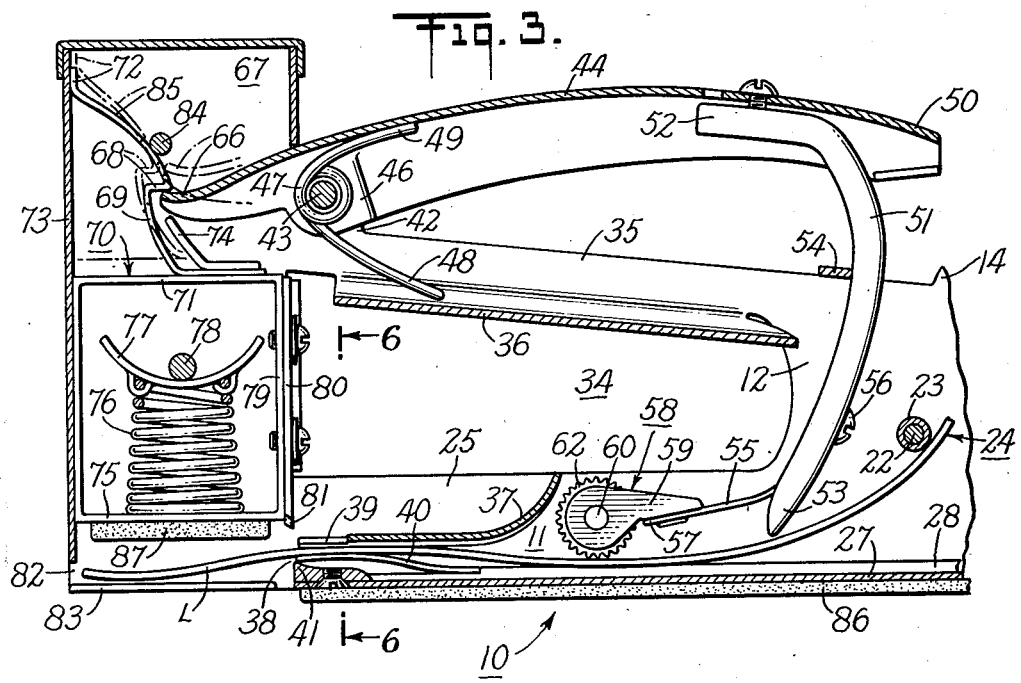
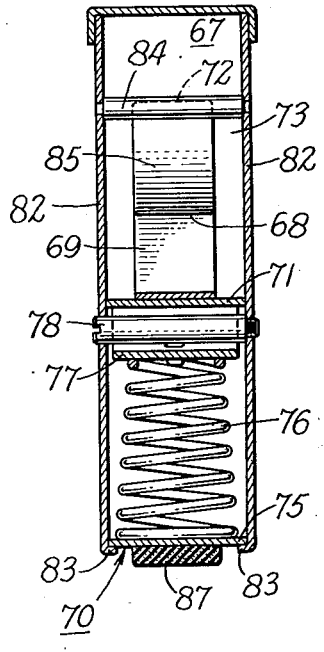
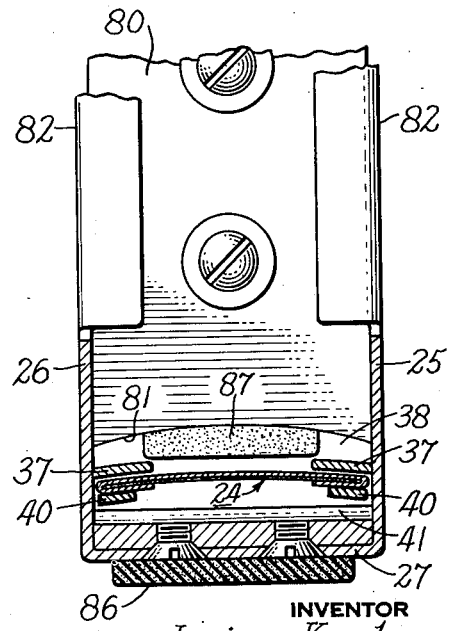
INVENTOR
*Irving Kaplan*
BY
his ATTORNEY April 14, 1953 — I. KAPLAN — 2,634,877
TACKING FOR PRESSURE SENSITIVE ADHESIVE
TAPE AND ADHESIVE ROLL FOR THE SAME
Filed Jan. 25, 1949 — 4 Sheets—Sheet 4

INVENTOR
Irving Kaplan
BY
J. F. Basseches
ATTORNEY

Patented Apr. 14, 1953

2,634,877

UNITED STATES PATENT OFFICE 2,634,877

TACKING FOR PRESSURE SENSITIVE ADHESIVE TAPE AND ADHESIVE ROLL FOR THE SAME

Irving Kaplan, Flushing, N. Y.

Application January 25, 1949, Serial No. 72,612

14 Claims. (Cl. 216—23)

This invention relates to a patch tacking device, and more particularly to a device for tacking or attaching tape.

It is an object of my invention to apply a segment of pressure sensitive adhesive tape or normally tacky tape to the surfaces of objects for a variety of purposes by a device which makes the operation possible by one hand control and which includes a mechanism for removing or peeling from a roll or section of indeterminate length, a segment or patch of tape carrying a pressure sensitive adhesive and severing the segment while applying pressure to affix the segment to a surface merely by the application of the pressure.

My invention in its more specific form includes the provision of a hand portable tool which has provision for carrying a roll of tape coated with a pressure sensitive adhesive, combining in such device means whereby a length of the tape may be stripped from the roll, including means to bias a spring pressed patch applying plunger so that the force of biasing the spring for the plunger manually likewise feeds a strip of tape and coordinates its action to the point where the plunger is released to cut a section of tape and apply the tape to the surface of an article to be coated, or to attach the section of tape for packaging purposes or otherwise, as herein more specifically indicated, to perform all of these operations by a single handed control.

Still further it is contemplated by my invention to provide a combination of tape dispenser and tacking device which may handle tape coated with a pressure sensitive adhesive surface, to combine the functions of stripping a length of tape and simultaneously cutting and pressing the same in position by a manual operation which feeds the tape, biasing a spring activated plunger for cutting and pressing the section of tape in position.

Still more particularly it is an object of my invention to provide in combination with a dispenser of pressure sensitive adhesive tape including strip removing means, of a roll of such tape of indeterminate length having the tape arranged in the roll with limited adhesive contact of the convolutions thereof with each other whereby the dispensing action of the mechanism may progress uniformly and facilely.

More particularly, it is an object of my invention to provide a tape dispensing and tacking mechanism for the dispensing of a tape section or patch carrying a pressure sensitive adhesive film exposed, and including mechanism for feeding a strip of such tape or patch to severing or cutting mechanism, without having the exposed adhesive surface interfere with the feeding mechanism, and including means for arranging the tape so that it may be pushed along its length to a cutting and applying plunger.

Still further objects of my invention reside in the provision of a low cost device of simplified construction and operation which will perform work of the application of short lengths of pressure sensitive adhesive tape for attachment to surfaces in a tacking operation or in a packaging operation which may be performed by one hand manipulation of the contrivance.

To attain these objects and such further objects as may appear herein, or be hereinafter pointed out, I make reference to the accompanying drawing forming a part hereof, in which—

Figure 1 is a perspective view illustrating my device;

Figure 2 is a magnified longitudinal section thereof in the normal position taken along the line 2—2 of Figure 1;

Figure 3 is a fragmentary view similar to Figure 2 at an intermediate stage of operation;

Figure 4 is a fragmentary section taken on the line 4—4 of Figure 2;

Figure 5 is a section taken on the line 5—5 of Figure 2;

Figure 6 is a magnified section taken on the line 6—6 of Figure 3;

Figure 7 is a magnified fragmentary section taken on the line 7—7 of Figure 2;

Figure 8 is a section taken on the line 8—8 of Figure 7;

Figure 9:
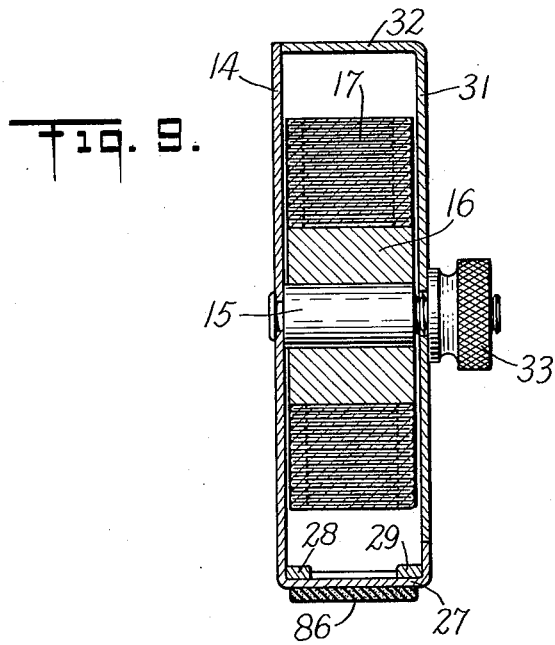
Figure 9 is a fragmentary section taken on the line 9—9 of Figure 2.

Making reference to the drawing, it is contemplated by my invention to provide a device in which an operator may use one hand to perform the operations which include drawing off a section or patch of tape from a roll of tape including a coating of pressure sensitive adhesive and while holding the device adjacent a surface to which the patch is to be applied, and by operation with one hand impelling the patch against the surface to adhere the same merely by the application of pressure to the rear surface of the patch which has the non-adhesive surface.

Specifically, the device in one embodiment thereof includes the provision of means to support a roll of tape, such as that now produced under the trade-mark "Scotch" cellophane tape or "Scotch" masking tape which provides an assembly having a non-adhesive back carrying a pressure sensitive adhesive or normally tacky film, with edges of the tape rendered or formed to be inactive as by localizing the pressure sensitive adhesive coating, to leave portions thereof uncoated or by starting with a uniformly coated width of the tape and forming an edge or seam or fold, which serves as the inactive edge. The provision of tape of this character may be handled in the device in accordance with my invention whereby a strip of the tape may be pushed or drawn along its own length without any protective covering for the pressure sensitive adhesive coating and by applying contact of limited character to the inactive surfaces described, moving the tape adjacent a plunger, at which position the tape is cut by the same manipulating mechanism which strips the tape and moves it into position adjacent the plunger. The movement of stripping the film and moving a portion thereof adjacent the plunger is effected by a one hand operation which likewise serves to bias or tension a spring on the plunger within limits for accumulating the tension and then releasing the plunger to impel the patch against a surface, desirably including in such impelling action the severing of a predetermined length from the roll of tape of indeterminate length.

Specifically also, the mechanism for single hand operation of my tacking device, without injury to the surface, includes novel means for handling the strip of tape so that it may be fed from the roll to the plunger tacking mechanism by a simple pushing operation by including means for guiding the tape to stiffen it or bow it, so as to feed it conveniently by a pushing action.

Still further, the mechanism may include plunger means for applying impelling force to a patch of pressure sensitive adhesive contoured to apply the patch for packaging pruposes, such as to the corner of a package or to envelope small articles for attachment to other surfaces for holding the same in position or to form show cards or display cards.

The features of my invention with regard to the drawing will now be described and include the body 10 desirably formed of sheet metal to outline a channel 11, having upstanding branches 12 and 13. The branch 12 rearwardly has a circular enlargement 14 axially supporting a cross shaft 15 upon which may be mounted the core 16 of a roll of tape 17. The roll of tape has been previously prepared and includes a backing of flexible tape material, such as cellophane or paper treated to render the back exposed surface inactive to tacky, rubbery or pressure sensitive adhesives, or those of the kind such as made in the art whereby the pressure sensitive adhesive film may be coated upon a web and stripped from the roll notwithstanding the contact of the adhesive surface with the overlying back surface of the convolution of the tape.

In accordance with my invention, I form the roll 17 of tape which has an adhesive surface 18 disposed between side edge portions 19 which are non-adhesive. In the embodiment illustrated, this non-adhesive surface is obtained by the edge fold 20, to leave front facing areas 21 adjacent the side edges with an inactive surface, spacing the alternate adhesive surfaces in the convolutions from each other to some extent and making a roll of the tape which unrolls with but the slightest or negligible amount of stripping force in all positions of take-off as compared with the force of unrolling of the original tape.

With a tape which I may use thus described, I will now refer to the tacking device illustrated wherein the branches 12 and 13 are rigidly supported by a cross bolt 22, having a guide roller 23 for engaging the take-off strip 24 from the roll, with the back or non-adhesive surface in contact with the guide. The take-off strip is laid between the short branches 25 and 26 adjacent the base 27 connecting the branches. The base 27 is lined with rails or guides 28 and 29, extending adjacent the terminal portion 30 for engaging the cap 31 comprising a parti-cylindrical flange 32 held in roll covering position by the knurled nut 33 and screw-threaded to the cross shaft 15.

The branches 12 and 13 previously described have been formed with side cutouts to define the hand hold apertures 34 which make the channel 11 accessible. The metal so cut is folded to define hand rails 35 and a transverse gripping rib 36.

The branches 25 and 26 of the channel 11 support a funnel-shaped guide 37 which constricts toward the throat 38 formed between the branches 25 and 26 and includes a cutout 39 for access to the strip laid beneath the funnel 37. Within the funnel and the space between the rails 28 and 29, I provide lifting spring strips 40, 40 which normally space the adhesive strip 24 from the rails 28 and 29 and likewise space the strip from the cutter member 41 adjacent the throat 38 just described. The cutting edge contour of this cutter is desirably concave, as will appear more clearly hereafter, to secure cutting from the edge inwardly.

Referring now to the handle outlining strips 35 adjacent the forward portion thereof, they are formed with ears 42 supporting the transverse cross bolt 43, providing a cross shaft on which is trunnioned the handle 44, preferably formed of channel-shaped sheet metal having downwardly directed side flanges 45, having offset ears 46 forming bearings to receive the bolt 43 pivotally mounting the handle thereon. The bolt 43 serves as the anchor for the spring 47 whose branches 48 and 49 are tensioned outwardly against the rib 36 and the handle 44, normally to bias the handle spaced from the gripping rim. The handle adjacent the end 50 supports the feeder bracket 51, whose upper base 52 is attached to the handle.

The free end 53 is guided over the cross strip 54 to direct the free end 53 of the feeder bracket between the branches 12 and 13 into the channel 11, between the short branches 25 and 26. The feeder bracket carries a resilient arm 55 by the attaching bolt 56. A leaf spring is used for this purpose to permit the free end 57 to yield. The end 57 carries a roller pusher assembly 58 comprising side branches 59 to which is fixedly riveted the cross shaft 60 supporting the camming race 61 and revolubly supporting the knurled sleeve 62. The camming race 61 has an offset quadrangular cutout 63 in the trailing edge thereof and houses the roller 64 in the annular space between the quadrangular cutout and the annulus of the sleeve 62. The knurled sleeve 62 has clearance portions 65, as will appear more clearly from Figure 7, to limit the peripheral contact edgewise immediately over the rails 28 and 29.

The pushing action and pivotal movement on the handle 44 directs the pushing roller first against the base 27 of the channel and then deflects the same forwardly in the direction of the throat, as will be apparent from an inspection of Figures 2 and 3. The rolling action forwardly is only momentarily as the knurled sleeve, at its inner annulus, will engage the roller 64 and brake the movement thereof by the eccentric camming action effected by the roller riding into the more confined area adjacent the non-radial wall of the quadrangular cutout 63. The roller pusher assembly then is positively locked to pinch toward the rails 40, 40 in its forward movement toward the throat 38. Reverse movement, such as by releasing the handle 44 to permit expansion of the branches 48 and 49 of the spring 47 will permit the roller to become disengaged from the brake of the roller 64, to move rearwardly to the normal position shown in Figure 2 without back drag on the strip 24 which may be there positioned.

The handle 44 has a lift finger or nose 66 entering into the housing 67 and engaging the tooth 68 of the pawl 69 mounted and attached upon the plunger strap 70 and slidingly guided in the correspondingly shaped housing 67. The plunger 70 is desirably a metal strap shaped to form a rectangular frame, to the upper branch 71 of which the pawl 69, as above stated, is attached. The pawl 69 has its free end 72 tensioning against the wall 73 and slidable therewith. Inwardly, the pawl is limited in its movement by the finger 74.

The plunger strap 70 has its lower branch 75 tensioned against the internal spring 76 at one end, and engaging an arcuate anchor plate 77 adjacent the upper end 71. A cross pin 78 serves as the anchor point for the anchor plate of the spring 76 as well as to restrain outward movement of the plunger strap assembly. The plunger strap branch 79 has affixed thereto, by suitable screws for removability and replacement, the knife 80, whose edge 81 is of concave contour and is complementarily positioned with regard to the cutter member 41.

The housing walls 82 terminate in inwardly directed flanges 83, to limit the outward movement of the plunger strap to the point of engagement of the branch 75 in one direction. The plunger strap may be moved upwardly by engagement of the nose 66 with the tooth 68 and its movement upwardly may continue uninterruptedly until the pawl 69 engages the camming pin 84 on the pawl camming face 85. The greater movement upwardly of the plunger unlatches the tooth 68 from the nose 66, to the point where a predetermined limiting position releases the plunger against the spring tension of the spring 76. The nose 66 at this point has moved past the tooth 68, as shown in dotted line in Figure 3, impelling the plunger strap to the limiting position shown in Figure 2. The channel 27 is provided with a padding layer 86, such as sheet rubber or cork. The plunger strap branch 75 is provided with a pad 87 of similar material, of a thickness which projects the sticking surface slightly beyond the plane of the layer 86 and between the inturned flanges 83.

With the construction thus described, the operation of my assembly will be clear, as follows:

A roll of tape, as devised by me, having been positioned upon the shaft 15 and the cap 31 fixed in position, the leading strip 24 may be threaded below the guide 22 by the fingers of the operator and then guided into the funnel 37 in the direction of the throat 38. The clearance slot 39 permits the use of some instrumentality, such as a pencil point, to effect the threading action. In this position, the fingers of the operator may then grasp the entire assembly by the opposed action afforded by the hand rail 35 and the handle 44. A partial movement bringing the feeder bracket 51 within the channel 11 serves to feed the strip outwardly through the throat by a reciprocating or pumping action of limited character, to position a length L beneath the plunger 87 since each partial movement of the handle to the point where the camming surface 85 is not tripped by the camming pin 84 merely uncovers the throat 38 and may be used to effect the pushing action of the pusher assembly 58, When a predetermined length has been fed between the flanges 83, the operator locates the nose of the device, with the plunger face 87 superimposed on the spot to which the tape is to be affixed. The clamping or gripping of the handle rail 35 and the handle 44 toward each other to the limiting position unlatches the engagement of the nose 66 with the pawl tooth 68, to release the plunger to impelling movement by the spring 76. The foregoing operation then brings the cutters 41 and 81 into engagement, to sever the strip 61 and clap the strip L against the surface to which the strip is to be attached. Release of the fingers serves to drive the nose 66 against the camming surface 85, to deflect the nose 66 into engagement with the tooth 68, to reestablish the operative position.

It will thus be observed that a single hand operation may be resorted to, to feed a strip of tape through the throat into a plunger engaging and cutting position.

Upon severing action, the lifting strip 40 reassumes the deflecting position, to disengage the adhesive surface 18 from the cutter element 41, thereby relieving the strip 24 from any resistance to being fed lengthwise of the channel along the guides 28 and 29.

In the illustration, the lifting strips 40 cooperate with the arcuate internal contour of the funnel 37, tending to bow the strip 24 along its length between a point beyond the guide 23 and the throat 38. This arcuate, transversely bowed condition of the tape tends longitudinally to stiffen the same so that it may be moved along its length from the point of engagement with the sleeve 62 to the throat without buckling within the passage provided by the funnel 37 and the channel above the base 27.

By the device provided, patches of pressure sensitive adhesive tape may be tacked, so-to-speak, to surfaces whereby posters and labels or similar objects may be temporarily affixed to other objects. Likewise, sales tags or other forms of patches may be applied to articles, leaving the operator free to adjust the contrivance with one hand, while performing the tacking operation with the other. The employment of adhesive tape having edges thereof non-adhesively formed permits the finger nails readily to grip the tape edge for removal of the tape.

Figure 10:
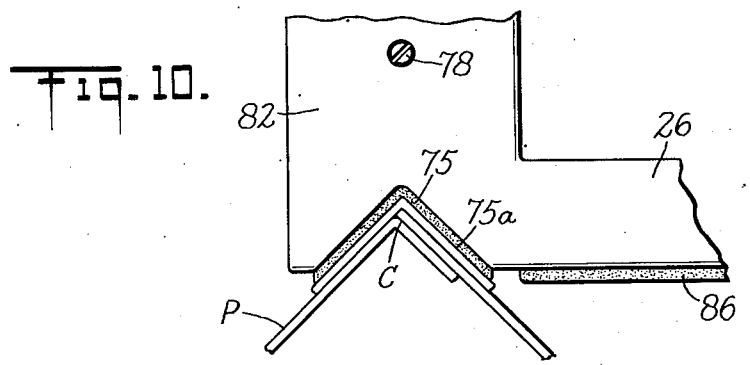
Figures 10 and 11 show different forms of plungers for performing packaging operations with my device.

In Figure 10 I have shown a fragmentary portion of my device wherein the plunger member 75 is differently contoured and shows an angular face 75a. With a plunger so devised, my patch applying mechanism may be held over a corner C of a package P, to seal the flap portion of such package into engagement by the overlap furnished by the patch applying device in accordance with my invention.

Figure 11:
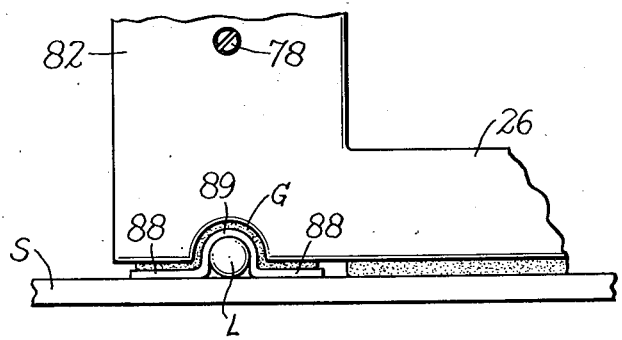

In Figure 11, another application of my device is illustrated wherein a showcard S may have small articles, such as lipsticks, fountain pens or the like L mounted thereon. In this embodiment, the plunger is formed with a grooved section G, generally shaped to span the article L. With such a contrivance, the operator holds the patch applying mechanism over the article L to effect the patch applying operation while spanning the same article, and thereby attach the segments 88 to the sheet S, forming the article embracing loop 89. By this arrangement, packaging of small articles may be quickly effected since in each instance, the article may be held in position on the show card or the like by one hand of the operator, guiding the patch applying or patch tacking mechanism with the other.

It will thus be observed that I have provided a patch tacking mechanism of simple yet effective construction.

It will also be observed that I have provided as a new article of manufacture, a roll of tape of pressure sensitive adhesive material involving a roll of tape of indeterminate length of which the backing is coated with a continuous layer of pressure sensitive adhesive, and the edges of which are inwardly folded to present the back surface fragment in contact with the next adjacent layer. In this form each of the inwardly turned folds adjacent the edges serves in the nature of a liner to effect a reduction in adhesive contact between the convolutions. This serves to make manual stripping of the convolutions from each other possible in a simple feeding device by a comparatively simple operation without intricate mechanism to apply a large force secured by some mechanical advantage mechanism and normally required to strip flat back adhesive or directly contacting adhesive layers from each other in adjacent convolutions.

Having thus described my invention and illustrated its use, what I claim as new and desire to secure by Letters Patent, is—

1. In a device for dispensing and cutting tape, the combination comprising tape roll mounting means, feeding means having limited points of contact at the edges of the tape, a tape patch applying plunger, and manually operable means comprising a pivot lever having a driving connection providing a high mechanical advantage common to said plunger and feeding means.

2. In a machine for applying pressure sensitive adhesive tape, the combination comprising a resilient patch applying plunger, biasing means for said plunger comprising a spring biasing member, means for mounting a roll of tape, means for feeding tape to a point adjacent the face of said plunger having a limited point of contact and common means comprising a pivot lever having a driving connection providing a high mechanical advantage for actuating said plunger and tape feeding means.

3. In a tacking mechanism for applying a patch of pressure sensitive adhesive tape, the combination comprising means for mounting a roll of said tape, tape guiding means, a tape applying plunger, spring biasing means for said plunger, manually operable means comprising a pivot lever having a driving connection providing a high mechanical advantage common to said biasing means and feeding means having a very limited point of contact for moving said tape to said plunger along said guides.

4. In a tacking mechanism for applying a patch of pressure sensitive adhesive tape, the combination comprising means for mounting a roll of tape, tape guiding means, a tape applying plunger, spring biasing means for said plunger, manually operable means common to said biasing means and feeding means for moving said tape to said plunger along said guides comprising tape pushing means.

5. In a device of the character described including a patch applying plunger actuated by spring tension, biasing means therefor comprising a manually operable lever having latch engaging means with said plunger, means for mounting a roll of tape, tape feeding means actuated by said manual means, a tape guide including means for bowing said tape transversely to stiffen it and tape pushing means actuated by said manual means.

6. A patch applying device of the character including, in combination, a spring pressed impelling smooth faced plunger, means for biasing said plunger including a latch engageable lever member, means for mounting a roll of pressure sensitive adhesive tape, a tape guide for a lead off strip having edgewise contact with said tape to engage limited inactive areas of said tape, complementarily located tape severing means on said plunger and guide, manual means for biasing and releasing said plunger including tape pushing means from a roll thereof to said plunger means.

7. In a device for applying a patch from a roll of tape including a plunger for said patch and tape feeding means to feed said tape in the path of the plunger, with tape severing means at an intermediate point, the combination comprising tape guides having limited contact with the tape, yieldable under the severing means and resiliently spacing the tape clear from engagement with said severing means after each severing operation.

8. A tacking device comprising a frame, a plunger in the front of said frame and adapted for reciprocation, a handle mounted in said frame, cooperating pawl and finger on said plunger and handle for retracting said plunger by movement of said handle, means for releasing said plunger from said finger at the upper end of its path, spring means for forcing said plunger downwardly, a resiliently mounted pusher on said handle for feeding adhesive tape under said plunger while it is held by said pawl and finger, and cooperating cutters on said plunger and frame for cutting a patch from said tape.

9. A tacking device comprising a frame, a plunger in the front of said frame and adapted for reciprocation, a pivoted handle mounted in said frame, cooperating pawl and finger on said plunger and handle for retracting said plunger by a downward movement of said handle, means for releasing said plunger from said finger at the upper end of its path, spring means for forcing said plunger downwardly, a resiliently mounted pusher on said handle for feeding adhesive tape under said plunger while it is held by said pawl and finger, and cooperating cutters on said plunger and frame for cutting a patch from said tape.

10. A tacking device comprising a frame, a plunger in the front of said frame and adapted for reciprocation, a handle pivoted in said frame, cooperating pawl on said plunger and finger on said handle beyond the pivot thereof for retracting said plunger by movement of said handle, means for releasing said plunger from said finger at the upper end if its path, spring means for forcing said plunger downwardly, means secured to said handle for feeding adhesive tape under said plunger, and cooperating cutters on said plunger and frame for cutting a patch from said tape.

11. A tacking device comprising a frame, a plunger in the front of said frame and adapted for reciprocation, a handle pivoted in said frame, cooperating pawl and finger on said plunger and handle for retracting said plunger by movement of said handle, means for releasing said plunger from said finger at the upper end of its path, spring means for forcing said plunger downwardly, means for feeding adhesive tape under said plunger, and cooperating cutters on said plunger and frame for cutting a patch from said tape, said tape feeding means including a tape pusher secured to said handle and adjacent to said tape, said pusher adapted to contact said tape when said handle is in engagement with said plunger while it is held by said pawl and finger, the movement of said handle in said position causing forward feeding of said tape.

12. A tacking device comprising a frame, a plunger in the front of said frame and adapted for reciprocation, a handle pivoted in said frame, cooperating pawl and finger on said plunger and handle for retracting said plunger by movement of said handle, means for releasing said plunger from said finger at the upper end of its path, spring means for forcing said plunger downwardly, means for feeding adhesive tape under said plunger, and cooperating cutters on said plunger and frame for cutting a patch from said tape, said tape feeding means including a tape pusher secured to said handle and adjacent to said tape, said pusher adapted to contact said tape when said handle is in engagement with said plunger while it is held by said pawl and finger, the movement of said handle in said position causing forward feeding of said tape, said pusher being out of contact with said tape when said plunger is released.

13. A tacking device comprising a frame, a plunger in the front of said frame and adapted for reciprocation, a handle pivoted in said frame, cooperating pawl and finger on said plunger and handle for retracting said plunger by movement of said handle, means for releasing said plunger from said finger at the upper end of its path, spring means for forcing said plunger downwardly, means for feeding adhesive tape under said plunger, and cooperating cutters on said plunger and frame for cutting a patch from said tape, said tape feeding means including a tape pusher secured to said handle and adjacent to said tape, said pusher adapted to contact said tape when said handle is in engagement with said plunger while it is held by said pawl and finger, the movement of said handle in said position causing forward feeding of said tape, said pusher being spring biased toward said tape.

14. A tacking device comprising a frame, a plunger in the front of said frame and adapted for reciprocation, a handle mounted in said frame, cooperating pawl and finger on said plunger and handle for retracting said plunger by movement of said handle, means for releasing said plunger from said finger at the upper end of its path, spring means for forcing said plunger downwardly, means for feeding adhesive tape under said plunger, and cooperating cutters on said plunger and frame for cutting a patch from said tape, said tape feeding means including a tape pusher secured to said handle and adjacent to said tape, said pusher adapted to contact said tape when said handle is in engagement with said plunger, the movement of said handle in said position causing forward feeding of said tape, said pusher being a roller with means for locking the same in the forward movement and for permitting free rolling thereof in the reverse movement.

IRVING KAPLAN.

References Cited in the file of this patent

UNITED STATES PATENTS

| Number | Name | Date |
|---|---|---|
| 1,320,692 | Hulse | Nov. 4, 1919 |
| 1,371,677 | Frederick | Mar. 15, 1921 |
| 1,775,404 | Mohr | Sept. 9, 1930 |
| 2,100,652 | Shimer | Nov. 30, 1937 |
| 2,359,699 | Valentine | Oct. 3, 1944 |
| 2,493,737 | Burns | Jan. 10, 1950 |